United States Patent

[11] 3,592,441

| [72] | Inventor | Miroslav J. Pirroutek<br>Stamford, Conn. |
|---|---|---|
| [21] | Appl. No. | 818,627 |
| [22] | Filed | Apr. 23, 1969 |
| [45] | Patented | July 13, 1971 |
| [73] | Assignee | Self-Matic Valves Corporation<br>Stamford, Conn. |

[54] FITTINGS FOR ANCHORING PILOT AIR CONDUIT IN OPERATIONAL POSITIONS
9 Claims, 6 Drawing Figs.

| [52] | U.S. Cl. | 251/364 |
|---|---|---|
| [51] | Int. Cl. | F16k 25/00 |
| [50] | Field of Search | 285/255,<br>245, 243, 242, 158; 137/625.61, 596.14; 251/364 |

[56] References Cited
UNITED STATES PATENTS

| 795,796 | 7/1905 | Gottwald | 285/245 |
|---|---|---|---|
| 939,539 | 11/1909 | Pahlow | 285/245 |
| 2,708,948 | 5/1955 | Segerstad | 137/625.61 |
| 3,070,117 | 12/1962 | Callahan et al. | 137/360 |
| 3,222,091 | 12/1965 | Marshall | 285/255 X |
| 3,224,278 | 12/1965 | Reid et al. | 137/625.61 X |
| 3,262,721 | 7/1966 | Knight | 285/242 X |
| 3,331,386 | 7/1967 | Politz | 137/360 X |
| 3,361,449 | 1/1968 | Parro | 285/255 X |
| 3,455,330 | 7/1969 | Williams et al. | 137/596 |

*Primary Examiner*—Samuel Scott
*Attorney*—Blair, Cesari and St. Onge

ABSTRACT: The disclosed fittings are used in conjunction with back pressure actuated control valves having pilot conduit for conveying pilot air of exceptionally low volume and pressure bled from each end of the valve. The fittings serve to anchor the pilot conduit in positions to be engaged by external members for the purpose of blocking the escape of pilot air therefrom. Sufficient pilot air back pressure is thus developed for shifting the control valve spool from one position to another.

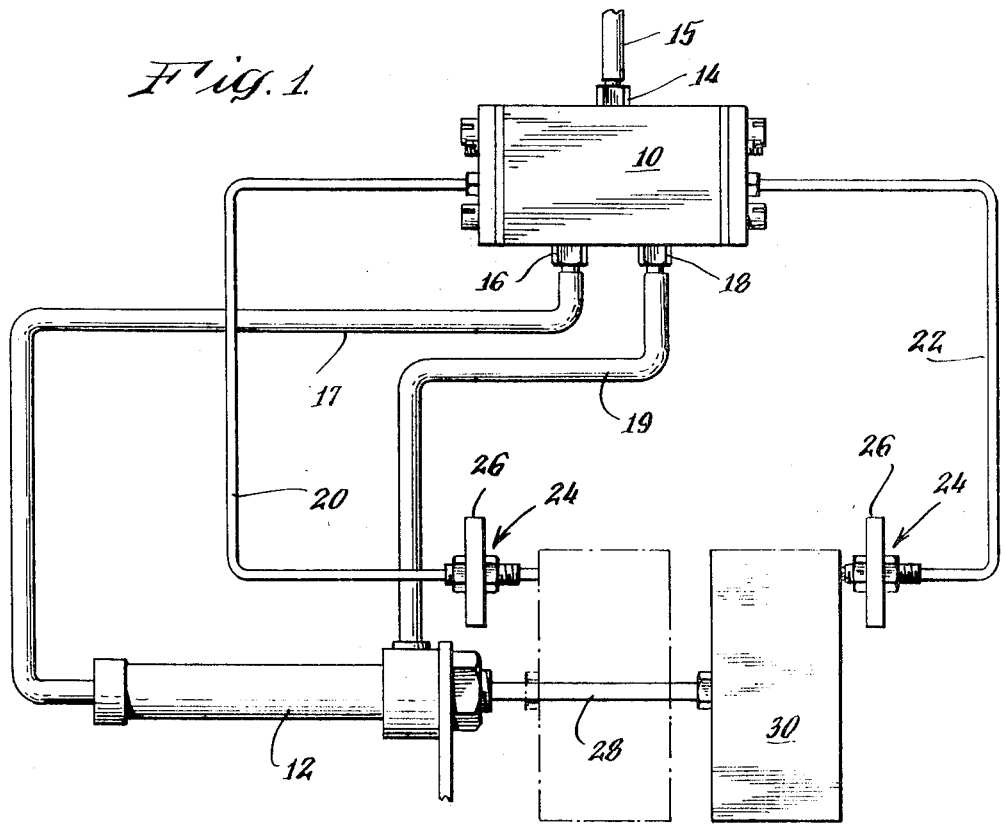
Fig. 1.
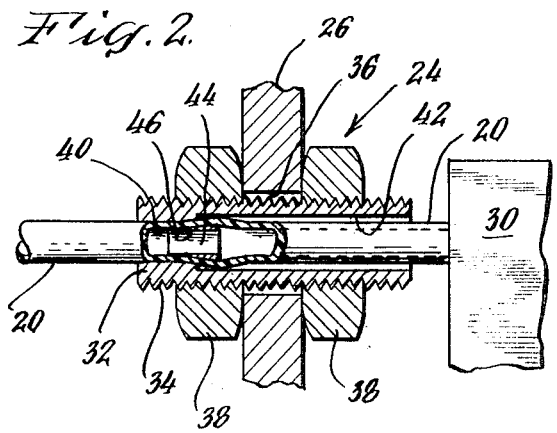
Fig. 2.
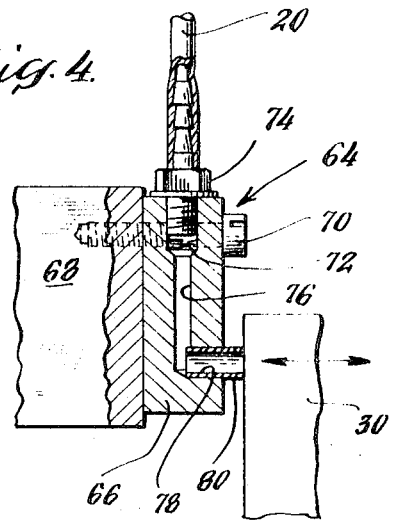
Fig. 4.
Fig. 3.
INVENTOR.
Miroslav J. Piroutek
BY
Blair, Cesari and St. Onge
ATTORNEYS.

FITTINGS FOR ANCHORING PILOT AIR CONDUIT IN OPERATIONAL POSITIONS

REFERENCE TO RELATED APPLICATION

This application discloses and claims various embodiments of pilot conduit-anchoring fittings particularly adapted for the use in conjunction with control valves disclosed in my copending application, Ser. No. 818,568, filed Apr. 23, 1969 and entitled "Back Pressure Directional Control Valves Employing Pilot Air of Low Volume and Pressure." The disclosure of this copending application is specifically incorporated herein by reference.

BACKGROUND OF THE INVENTION

In "back pressure actuated" control valves, pilot air is continuously bled from each end of the valve. The outlet for the pilot air from one end of the valve is blocked to develop a back pressure sufficient to shift the position of the control valve spool. Prior control valves actuated in this manner have the disadvantages of employing separate pilot valves to block the escape of pilot air, using pilot air at higher pressure and volume, and requiring higher force to block this air, as compared to the control valves of my above-noted copending application.

These pilot valves add to the expense of the control valve and, due to their size, present problems in many installations where space at the actuating locations is limited.

SUMMARY OF THE INVENTION

In accordance with the present invention, fittings are provided for operationally positioning valveless, open ends of pilot conduit adapted for actuating back pressure actuated control valves. This invention is particularly applicable to the control valves disclosed in my above-noted copending application wherein pilot air is bled through the pilot conduit from each end of the valve at an extremely low volume and pressure. As a consequence, only light contacting engagement of the open ends of the pilot conduit is required to block the escape of pilot air and thereby create the requisite back pressure for forcibly shifting the spool position.

The fittings of my invention are of simplified construction and inexpensive to manufacture. They are adapted to fixedly position an open ended, resilient tubular element communicating with the pilot conduit at an actuating location typically remote from the control valve itself. The tubular element whose open end is engaged to block the escape of pilot air may be a separate element or an integral extension of the pilot conduit. My fittings can be made extremely small in side and thus can be situated in cramped quarters where blockage of the pilot air by a system operating element is to be effected. This greatly simplifies systems implementation and installation of the control valves. Moreover, the fittings of my invention are adapted to maintain the exhaust ends of the pilot hose precisely positioned despite repeated impacts by the members acting to block the flow of pilot air therefrom.

In addition, the principles of my invention may be embodied not only in separate fittings to be attached to stationary machine parts or frame members but also in the machine parts or frame members themselves after very slight modification.

The invention accordingly comprises the features of constructions, combinations of elements, and arrangement of parts which will be exemplified in the constructions hereinafter set forth, and the scope of the invention will be indicated in the claims.

For a fuller understanding of the nature and objects of the invention, reference should be had to the following detailed description taken in connection with the accompanying drawings in which:

FIG. 1 is a diagrammatic illustration of a system application for the fittings of my invention;

FIG. 2 is a longitudinal sectional view of a fitting constructed according to one embodiment of my invention;

FIG. 3 is a longitudinal sectional view of a fitting constructed according to another embodiment of my invention;

FIG. 4 is a longitudinal sectional view of a fitting constructed according to still another embodiment of my invention;

Similar reference numerals refer to corresponding parts throughout the several views of the drawings.

DETAILED DESCRIPTION

Figure 5:
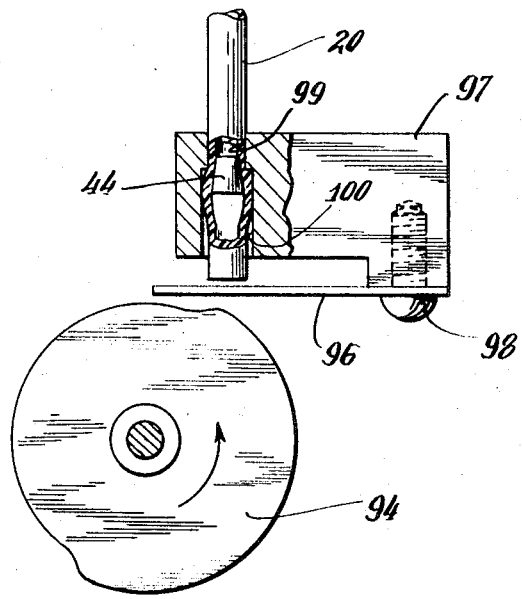
FIG. 5 is a side elevational view, partially in section, illustrating the incorporation of my invention into a machine member.

Referring now to the drawings, a control valve, generally indicated at 10, is shown as FIG. 1 incorporated in a system for actuating a cylinder, generally indicated at 12. For a detailed description of valve 10, reference is made to my above-noted copending application. Air under pressure from a source (not shown) is supplied to an inlet port 14 of valve 10 through a conduit 15.

Valve 10 is provided with a pair of outlet ports 16 and 18, which are respectively coupled by conduits 17 and 19 to opposite ends of the cylinder 12. Depending upon the position of valve 10, air supplied through conduit 15 to inlet port 14 flows through either outlet 16 or 18 and conduit 17 or 19, respectively, forcing a piston (not shown) within cylinder 12 to move in one direction or the other.

In order to change the position of valve 10 and thus the direction of airflow into and out of cylinder 12, resilient pilot hose 20 and 22 are coupled to opposite ends of the valve to bleed pilot air therefrom. Pilot air is tapped from the air supplied to inlet port 14.

In the system application shown in FIG. 1, the open ends of hose 20 and 22 are mounted in opposed relation by fittings constructed according to one embodiment of my invention and generally, indicated at 24. The fittings 24 are, in turn, mounted by brackets 26. An actuating rod 28 connected to the piston within cylinder 12, reciprocates a machine element such as a slide 30 between positions closing off the open end of either hose 20 or hose 22. When the slide 30 is in the solid line position shown in FIG. 1 blocking the open end of hose 22, a back pressure is building up in the right end of valve 10. Pilot air bleeds freely from the open end of hose 20. Ultimately, this back pressure reaches the point where the valve spool in valve 10 is forced to the left end thereof. As a result, inlet port 14 is coupled to outlet port 18, and air is forced through conduit 19 into the right end of cylinder 12, moving the piston to the left. The slide 30 then moves to a position closing off the open end of hose 20, creating a back pressure at the left end of valve 10, ultimately forcing the spool to the right. Inlet port 14 is then coupled to outlet port 16 and air is forced through conduit 17 into the left end of cylinder 12, forcing the piston therein to the right. The slide 30 then assumes its other position blocking the open end of hose 22, and the operation repeats.

Turning to FIG. 2, the fitting 24 comprises a cylindrical body 32 having external threads 34 formed along its entire length. The body 32 is inserted through an aperture 36 in bracket 26, and a pair of nuts 38 are threaded in the body 32 such as to clamp the bracket therebetween, securing the fitting 24 in operating position.

The body 32 is formed having an axial bore 40 adapted to accommodate the hose 20 coming from the valve 10. The body 32 is counterbored to provide a bore 42. The hose extends through bores 40 and 42, and beyond to a location where its open end is positioned for contacting engagement by slide 30 pursuant to blocking the escape of pilot air therefrom. It will be appreciated that precise positioning of the hose end can be achieved by varying the axial positions of nuts 38 on body 32.

Bore 40 is of a diameter substantially equal to the outer diameter of hose, while bore 42 is somewhat larger in diameter. To anchor the hose 20 in operating position, a bushing 44 of truncated conical configuration is inserted, small end first, into the open end of the hose for some distance. The bushing has an axial bore 46 so that pilot air can flow therethrough and out the open end of the hose when unblocked. The diameter of the small end of bushing 44 is about equal to inner diameter of the hose while the diameter of the other, larger end can be approximately equal to the diameter of bore 40, or somewhat less.

It is thus seen that after the bushing 44 is inserted in the hose and the latter drawn to the left, as seen in FIG. 2, the hose is wedged against the entry into bore 40. Further movement of the hose to the left is inhibited, despite impacting forces in that direction exerted by slide 30 against the open end of the hose. The hose is therefore securely anchored in operational position.

Due to the resiliency of at least the terminal portion of hose 20, even light contacting engagement by a solid surface of slide 30 is sufficient to effect a rather perfect seal of its open end, thereby effectively blocking the escape of pilot air. This resiliency also will accommodate departures from parallelism between the hose end surface and the sealing surface of slide 30.

The diameter of bore 42 is necessarily larger than bore 40 in order to accommodate the presence of bushing 44. However, it also has a definite functional purpose. In the event of overtravel of slide 30 beyond that necessary to effect a seal of the hose open end, the portion of the hose to the right of bushing 44 will undergo axial compression. A certain length of the hose is necessary to absorb elastically a certain amount of overtravel, and the bore 42 provides guidance that prevents kinking of the hose. At the same time, since bore 42 is larger in diameter than hose 20, it can accommodate the radial expansion of the hose, which accompanies axial compression.

In the embodiment of my invention shown in FIG. 3, the fitting, generally indicated at 50, comprises a body 52 having external cylindrical threads on which are threaded nut 38 for clamping the fitting to a bracket 26 in the manner described in connection with fitting 24 of FIG. 2. The left end of body 52 if formed to provide a barbed nipple 54 for accommodating the pilot hose coming from the control valve. An axial bore 56 in the nipple section of the body 52 opens into a larger diameter bore 58, which in turn opens into a still larger diameter bore 60.

A resilient hose segment 62 is inserted through bore 60 and into bore 58. The diameter of bore 58 is slightly less than the outer diameter of hose segment 62, so that the left end portion of the hose segment is frictionally retained therein. The left end of the hose segment is sealed against the bottom of bore 58, and thus is anchored against the impact of slide 30. The hose segment extends to the right beyond bore 62 to locate its open end at a position where it can be temporarily sealed by slide 30. The somewhat larger diameter of bore 60 provides guidance for axial compression and accompanying radial expansion of hose segment 62 in response to any overtravel of slide 30.

The advantage of fitting 50 resides principally in the ability to independently replace the conduit 20 and elastic hose segment 62, which do not necessarily have to be of the same material. Thus any type of conduit such as metal could be used to convey the pilot air from the control valve 10 to the fitting 50. In this event, the barbed nipple 54 would be substituted by a threaded bore coaxial with bore 56, into which a fitting for metal conduit is threaded.

In the embodiment of the invention shown in FIG. 4, the fitting, generally indicated at 64, a body 66 is secured to a stationary machine member 68 by one or more bolts 70. A bore 72 in body 66 is tapped to receive a threaded nipple 74 accommodating the pilot hose 20 coming from the control valve. Here again, the pilot hose may be of any material, such as metal.

Bore 72 opens into a smaller bore 76 which, in turn, opens into the bottom of a bore 78 extending at a right angle thereto.

Bore 78 is of a diameter such as to frictional engage a resilient hose segment 80 inserted therein. The hose segment 80 extends beyond the body 66 to locate its open, outer end in position for sealing engagement with slide 30. The hose segment 80 is seated against the bottom of bore 78 and thus is anchored against the impact of slide 30. Since smaller bore 76 intersects the very bottom of bore 78, the hose segment 80 sealed therein does not block bore 76. Since bore 78 does not accommodate axial compression and radial expansion of hose segment 80, in order to prevent kinking thereof excessive overtravel of slide 30 should be avoided. This fitting is preferable where space available in the direction of segment 80 is limited.

In FIG. 5, the principles of my invention are shown incorporated in a shuttle mechanism, generally indicated at 82, which includes a guide block 84 having a surface 85 supporting a shuttle 86. The shuttle has an aperture 88 for accommodating parts, such as setscrews., and is reciprocated between its solid and dashed positions by cylinder 12. The cylinder is mounted by a bracket 86 secured to the guide block 84 by bolt 87.

An upstanding end wall 88 of guide block 84 serves as positive stop of the shuttle movement and is formed having a bore 90 and a counterbore 92 for receiving the end of resilient pilot hose 20. The hose is anchored with its open end located beyond the inner surface of wall 88 using bushing 44 as in the embodiment of FIG. 2. Thus the open end of hose 20 is positioned for sealing engagement with side surface of shuttle 86.

From FIG. 5 it is seen that the principles of my invention can be readily incorporated into existing equipment by the user. A portion of this equipment constitutes the body of the fitting and is suitably bored to accommodate the pilot hose. It will be appreciated that the features of the embodiments of FIGS. 3 and 4 could also be incorporated into the user's equipment.

Figure 6:
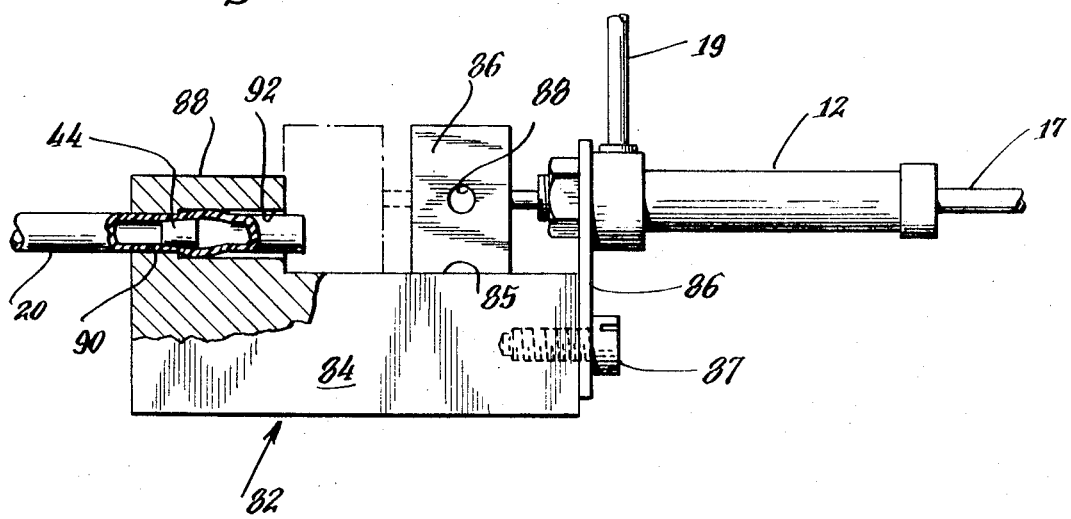
FIG. 6 is a plan view, partially in section, illustrating another system application of my invention.

In the embodiment of FIG. 6, control valve actuation is achieved by a rotating cam 94. The high surface of cam 94 deflects a leaf spring 96 into sealing engagement with the open end of pilot hose 20. The leaf spring 96 is secured at one end to a fitting body 97 by screw 98. The body 97 is formed having a bore 99 and a counterbore 100 through which the pilot hose 20 extends. The hose is shown anchored in operating position using bushing 44, as in the embodiment of FIG. 2. Alternatively, the anchoring provisions of FIGS. 3 and 4 may also be incorporated in body 97.

While the present invention has been described with particular emphasis on its application to back pressure actuated control valves, it will be appreciated that the teachings involved may be applied to other applications, such as in the field of fluidics.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

Having described my invention, what I claim as new and desire to secure by Letters Patent is:

1. A fitting for use in conjunction with back pressure actuated control valves and the like said fitting comprising in combination:

A. a body having means accommodating a conduit conveying pilot air bled from an end of a control valve;

B. a tubular element of resilient material communicating at one end with the pilot air conveying conduit, 1. The other open end of said element adapted to be temporarily engaged by a reciprocating external member to block the flow of pilot air therefrom and thereby produce actuation of the control valve; and C. means forming a bore stepped portion in a bore in said body communicating with said conduit accommodating means said bore having a first segment to one side of said stepped bore portion;

1. accommodating said tubular element with said open end thereof extending beyond said body, and
2. means coacting with said stepped bore portion to adapt said body to engage said tubular element to anchor it against endwise movement in response to engagement by the external member.

2. The fitting defined in claim 1 wherein said tubular element is an integral extension of the pilot air conveying conduit and said conduit accommodating means comprises a second bore segment to the other side of said stepped bore portion having a diameter substantially equal to the conduit, said first bore segment having a diameter somewhat larger than said tubular element; and
  1. said coacting means comprises an annular bushing of truncated conical configuration inserted into said tubular element for expanding its diameter to produce engagement with said body at the junction of said first and second segments.

3. The fitting defined in claim 1 wherein said conduit accommodating means includes a second segment of said bore to the other side of said stepped bore portion intersecting said first bore segment accommodating said tubular element at substantially a right angle.

4. The fitting defined in claim 1 wherein
  1) said first bore segment has a first diameter somewhat smaller than the outer diameter of said tubular element for snugly receiving a portion of said one end thereof,
  2) said coacting means comprises a second segment of said bore to the other side of said stepped bore portion having a second diameter smaller than said first diameter adapting said body to support said one end of said tubular element against axial dislocation.

5. The fitting defined in claim 4 wherein said bore is formed having
  1) a third bore segment beyond said first bore segment from said stepped bore portion having a third diameter somewhat larger than the outer diameter of said tubular element to thereby provide guidance during the axial compression and simultaneous radial expansion of said tubular element in response to engagement by the external member.

6. The fitting defined in claim 1 wherein said body further includes
  1. means for securing to a stationary bracket,
    a. said means being adjustable for varying the location of said open end of said tubular element.

7. The fitting defined in claim 6 wherein said securing means comprises
  1. screw threads formed on said body, and
  2. a pair of nuts adjustably threaded along said screw threads and adapted to clamp the stationary bracket therebetween.

8. The fitting defined in claim 1 wherein said body is constituted by an existing stationary member included in a system with the reciprocating member.

9. The fitting defined in claim 8 wherein said body further includes
  1. means for supporting the external member in its reciprocating movement.